United States Patent
Nama et al.

(10) Patent No.: US 10,296,179 B2
(45) Date of Patent: May 21, 2019

(54) SYSTEM AND METHOD FOR PRODUCING AND SUBMITTING A PIREP

(71) Applicant: HONEYWELL INTERNATIONAL INC., Morristown, NJ (US)

(72) Inventors: Naveen VenkateshPrasad Nama, Bangalore (IN); Dilip Kumar Behara, Bangalore (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 874 days.

(21) Appl. No.: 13/932,666

(22) Filed: Jul. 1, 2013

(65) Prior Publication Data
US 2015/0007080 A1    Jan. 1, 2015

(51) Int. Cl.
*G06F 17/00* (2019.01)
*G06F 3/0484* (2013.01)
*G01C 23/00* (2006.01)
*G08G 5/00* (2006.01)

(52) U.S. Cl.
CPC .......... *G06F 3/0484* (2013.01); *G01C 23/00* (2013.01); *G08G 5/0013* (2013.01); *G08G 5/0021* (2013.01)

(58) Field of Classification Search
CPC .......... G06F 3/00; G01S 13/953; G01S 13/87; G01S 13/9303; G01S 13/94; G01S 7/22; G01S 7/12; G01S 7/16; G01S 7/18; G08G 5/0021; G08G 5/0013; G08G 5/0091; G08G 5/00; G08G 5/0008; G08G 5/003; G08G 3/0484
USPC .................................................. 715/769, 771
See application file for complete search history.

(56) References Cited

U.S. PATENT DOCUMENTS

| | | | |
|---|---|---|---|
| 4,521,857 A * | 6/1985 | Reynolds, III ............. | 379/88.17 |
| 5,265,024 A * | 11/1993 | Crabill et al. ............. | 701/538 |
| 5,379,215 A * | 1/1995 | Kruhoeffer et al. ....... | 702/3 |
| 5,493,309 A * | 2/1996 | Bjornholt ................. | 342/455 |
| 5,657,009 A * | 8/1997 | Gordon .................... | 340/968 |
| 5,757,322 A * | 5/1998 | Ray et al. ................. | 342/460 |
| 6,014,606 A * | 1/2000 | Tu ............................ | 701/400 |
| 6,278,913 B1 * | 8/2001 | Jiang ....................... | G07C 5/0858 244/158.1 |
| 6,441,773 B1 | 8/2002 | Kelly et al. | |
| 6,633,801 B1 | 10/2003 | Durlacher et al. | |

(Continued)

FOREIGN PATENT DOCUMENTS

| | | |
|---|---|---|
| CN | 102682194 A | 9/2012 |
| EP | 2979427 A1 | 3/2013 |
| EP | 2595136 A2 | 5/2013 |

OTHER PUBLICATIONS

EP Extended Search Report for Application No. 14173189.3 dated Dec. 4, 2014.

(Continued)

*Primary Examiner* — Di Xiao
(74) *Attorney, Agent, or Firm* — Lorenz & Kopf, LLP (57) ABSTRACT

A system and method for textually displaying weather data on an onboard aircraft display comprises receiving weather data from onboard weather radar. A data collector is coupled to the weather radar and collects relevant data, which is then manipulated to place it in a PIREP (pilot report) format. The formatted data is then rendered on the aircraft display and subsequently transmitted to a ground station.

18 Claims, 5 Drawing Sheets

(56) References Cited

U.S. PATENT DOCUMENTS

| | | | |
|---|---|---|---|
| 6,744,382 B1* | 6/2004 | Lapis | G01C 23/005 340/963 |
| 6,828,922 B1 | 12/2004 | Gremmert et al. | |
| 6,882,302 B1 | 4/2005 | Woodell et al. | |
| 7,417,579 B1 | 8/2008 | Woodell | |
| 7,437,225 B1* | 10/2008 | Rathinam | G08G 5/0013 340/961 |
| 7,612,688 B1* | 11/2009 | Vigeant-Langlois | G01C 23/00 340/539.28 |
| 7,633,428 B1* | 12/2009 | McCusker | G01S 7/003 342/26 B |
| 8,085,182 B2 | 12/2011 | Kauffman | |
| 8,209,071 B2* | 6/2012 | Ross | 701/14 |
| 8,223,062 B2 | 7/2012 | Bunch et al. | |
| 8,341,413 B2* | 12/2012 | Belmonte | H04L 63/123 705/67 |
| 8,350,748 B2 | 1/2013 | Fouet et al. | |
| 2002/0039072 A1 | 4/2002 | Gremmert et al. | |
| 2004/0019509 A1* | 1/2004 | Bekkers | G06Q 10/02 705/5 |
| 2006/0129286 A1 | 6/2006 | King | |
| 2012/0274484 A1 | 11/2012 | Zimmer et al. | |
| 2013/0120166 A1* | 5/2013 | Kommuri | G08G 5/0013 340/971 |
| 2013/0245860 A1* | 9/2013 | Cooper | B64D 45/00 701/14 |
| 2014/0028476 A1* | 1/2014 | Kolbe | G08G 5/0021 340/971 |

OTHER PUBLICATIONS

Jason B Prince et al: "In-Service Evaluation of the Turbulence Auto-PIREP System and Enhanced Turbulence Radar Technologies,", Jul. 1, 2007, XP055154437, Retreived from Internet: URL:http://ntrs.nasa.gov/search.jsp?R=20070023592; pp. 1-12, 38.

EP Examination Report for Application No. EP 14173189.3-1557 dated Apr. 3, 2016.

Chinese Office Action for Application No. 201410362956.6 dated Oct. 16, 2017.

Chinese Office Action for Application No. 201410362956.6 dated Jul. 2, 2018.

* cited by examiner

SYSTEM AND METHOD FOR PRODUCING AND SUBMITTING A PIREP

TECHNICAL FIELD

Embodiments of the subject matter described herein relate generally to aircraft display systems, and more particularly, to an avionics display system and method for automatically submitting a Pilot Report (PIREP).

BACKGROUND

An abundance of weather data is provided to help pilots in provide a safe and controlled flight. For example, a pilot may receive NOTAM (Notices to Airmen), e.g. hazards such as air-shows, closed runways, military exercises; D-ATIS (Digital Automatic Terminal Information Service), e.g. weather, runway, approach information; METAR, e.g. weather report used by pilots as part of a pre-flight weather briefing; TAF (Terminal Aerodrome Forecast), e.g. weather forecast applicable to a five mile radius from the center of an airport runway; SIGMET (Significant Meteorological Information), e.g. meteorological information concerning safety of all aircraft; AIRMET (Airmen's Meteorological Information), e.g. weather along an air route that may affect aircraft safety; TFR (Temporary Flight Restrictions), e.g. sporting events, national disaster areas, space launches, etc.; PIREP (Pilot Report), an actual weather condition encountered by an aircraft in flight; FAA delays; winds; route weather; graphical weather data; etc.

In contrast, a pilot may generate a PIREP, which is a report of actual weather conditions encountered by an aircraft during a flight. The PIREP is typically transmitted to the nearest ground station via voice or datalink. The data is then encoded and relayed to other weather offices and air traffic service units. These PIREPs are organized in accordance with a specific FAA approved format utilizing a number of abbreviations that may be difficult to remember. Due to these complexities, a pilot may be discouraged from creating and sending a PIREP.

Many aircraft are equipped with on-board weather radar (radio detection and ranging) that detects hazardous weather and presents it on a cockpit display. These systems display weather based on the reflectivity or return echoes from the target and are color-coded on the display; i.e. green indicating light precipitation; yellow indicating moderate precipitation, possible reduced visibility, and moderate turbulence; and red indicating heavy precipitation leading to the possibility of thunderstorms, severe turbulence, and structural damage to aircraft. However, even when equipped with such on-board weather radar, the pilot must still collect the information related to bad weather, place it in PIREP format, and transmit it to ground in order to convey the weather information to ground.

In view of the foregoing, it would be desirable to reduce pilot workload by eliminating the need to remember the PIREP format. It is therefore contemplated that a system and method be provided for facilitating the collection and formatting severe weather related information encountered during a flight, textually and graphically presenting it in proper PIREP format to a pilot for the pilot's review and concurrence, and then transmitting the PIREP to a ground station. This reduces pilot workload and provides aircraft in surrounding airspace the opportunity to avoid bad weather, especially those aircraft not equipped with weather radar. Such a system contemplates the automatic collection of the required PIREP data and presentation of the data to the pilot in the prescribed PIREP format on a display.

BRIEF SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

A method is provided for graphically and textually displaying weather data on an onboard aircraft display. The method comprises receiving weather data from onboard weather radar. A data collector is coupled to the weather radar and collects relevant data, which is then manipulated to place it in a PIREP (pilot report) format. The formatted data is then rendered on the aircraft display.

A method is also provided for displaying weather data on an aircraft display. The method comprises collecting weather data from onboard weather radar, placing the weather data in a pilot report (PIREP) format, and rendering the data in the PIREP format in a preliminary form in at least one pop-up data box on the display for concurrence by the pilot.

A system for textually and graphically displaying weather data on an aircraft display is also provided. The system comprises onboard weather radar, a data collector coupled to the weather radar, a formatter coupled to the data collector for placing the data in a PIREP format, and a graphics module. A processor is coupled to the data collector and to the graphics module and is configured to render the PIREP data on the aircraft display and subsequently sending the PIREP to a ground station.

BRIEF DESCRIPTION OF THE DRAWINGS

A more complete understanding of the subject matter may be derived by referring to the detailed description and claims when considered in conjunction with the following figures, wherein like reference numerals refer to similar elements throughout the figures, and wherein:

DETAILED DESCRIPTION

The following detailed description is merely exemplary in nature and is not intended to limit the subject matter of the application and uses thereof. Furthermore, there is no intention to be bound by any theory presented in the preceding background or the following detailed description. Presented herein for purposes of explication is a certain exemplary embodiment of how PIREP may be displayed. However, it should be appreciated that this explicated example embodiment is merely an example and a guide for implementing the novel system and method for displaying visual flight reference points. As such, the examples presented herein are intended as non-limiting.

Techniques and technologies may be described herein in terms of functional and/or logical block components and with reference to symbolic representations of operations, processing tasks, and functions that may be performed by various computing components or devices. It should be appreciated that any number of hardware, software, and/or firmware components configured to perform the specified functions may realize the various block components shown in the figures. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

Figure 1:
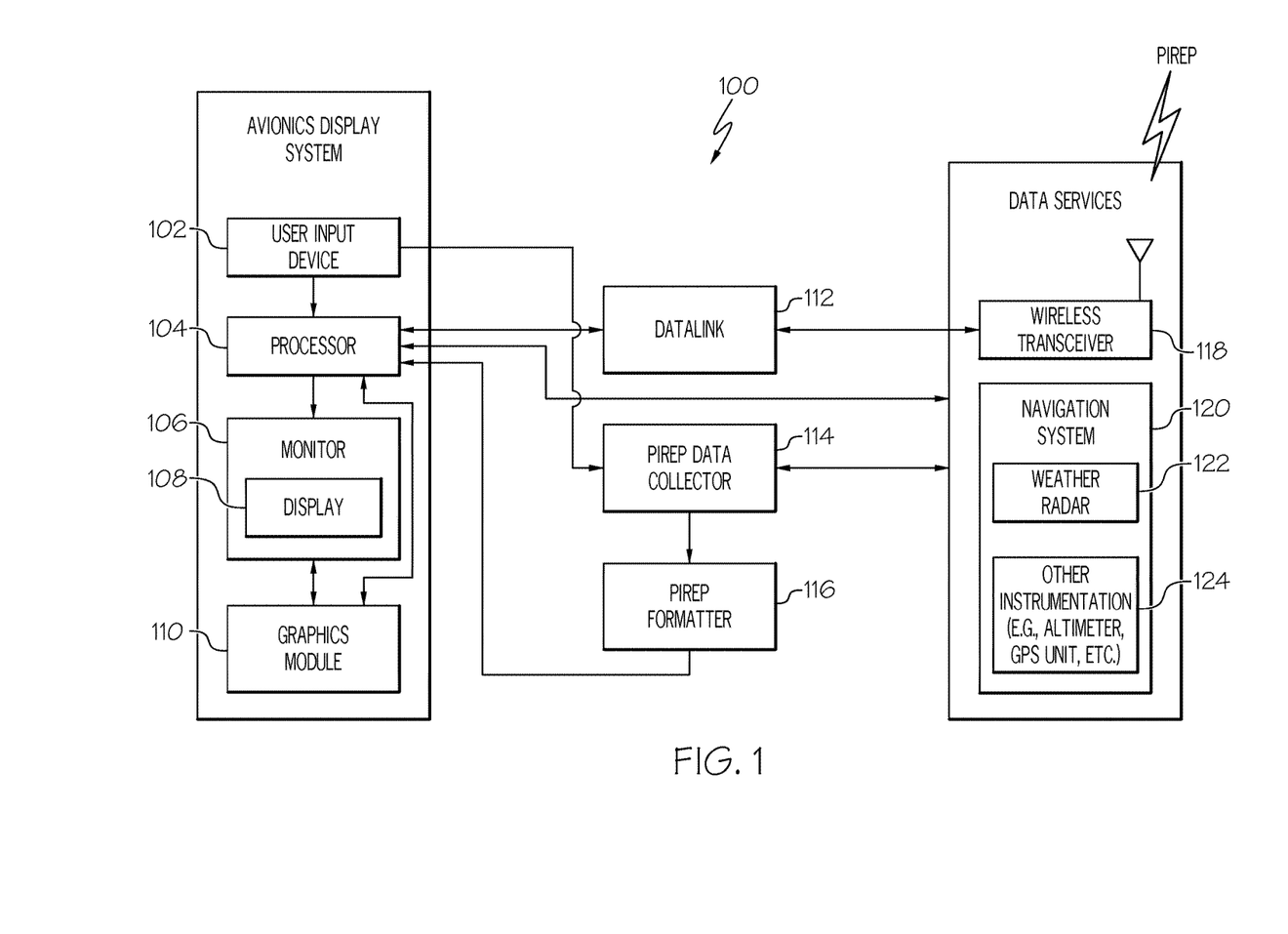
FIG. 1 is functional block diagram of a generalized avionics display system in accordance with an exemplary embodiment.

For the sake of brevity, conventional techniques related to graphics and image processing, navigation, flight planning, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment FIG. 1 is a functional block diagram of a generalized avionics display system 100 in accordance with an exemplary embodiment. Avionics display system 100 includes at least one processor 104 and at least one monitor 106, which is operatively coupled to processor 104. During operation of avionics display system 100, processor 104 drives graphics module 110 which, in conjunction with processor 104, drives monitor 106 to produce a display 108 that visually provides a pilot and crew with information pertaining to the host aircraft, neighboring aircraft, and weather within a predetermined vicinity of the host aircraft. Display 108 may include visual representations (textual and graphical) of one or more of flight characteristics pertaining to a neighboring aircraft and weather, as described more fully below. Processor 104 may generate display 108 in a two dimensional format (e.g., as a lateral or vertical profile map display) or in a hybrid format (e.g., in a picture-in-picture or split screen arrangement) and may be incorporated into all units capable of displaying data; e.g. the primary flight display, the multifunction display, and the interactive navigation display. Display 108 may also be comprised of a touch screen display.

Processor 104 may comprise, or be associated with, any suitable number of individual microprocessors, flight control computers, navigational equipment, memories, power supplies, storage devices, interface cards, and other standard components known in the art. In this respect, the processor 104 may include or cooperate with any number of software programs (e.g., avionics display programs) or instructions designed to carry out the various methods, process tasks, calculations, and control/display functions described below, for example, processor 104 may be included within a Flight Management Computer of the type commonly deployed within a Flight Management System (FMS).

Image-generating devices suitable for use as monitor 106 include various analog (e.g., cathode ray tube) and digital (e.g., liquid crystal, active matrix, plasma, etc.) display devices. In certain embodiments, monitor 106 may assume the form of a Head-Down Display (HDD) or a Head-Up Display (HUD) included within an aircraft's Electronic Flight Instrument System (EFIS). Monitor 106 may be disposed at various locations throughout the cockpit. For example, monitor 106 may comprise a primary flight display (PFD) and reside at a central location within the pilot's primary field-of-view. Alternatively, monitor 106 may comprise a secondary flight deck display, such as an Engine Instrument and Crew Advisory System (EICAS) display, mounted at a location for convenient observation by the aircraft crew but that generally resides outside of the pilot's primary field-of-view. In still further embodiments, monitor 106 may be worn by one or more members of the flight crew.

In the exemplary embodiment illustrated in FIG. 1, the data sources include a wireless transceiver 118 operatively coupled to a first input of processor 104, via datalink 112. A navigation system 120 is coupled to processor 104 and includes weather radar 122 and other onboard instrumentation 124 such as a radio altimeter, a barometric altimeter, a global positioning system (GPS) unit, and the like. In a preferred embodiment, navigation system 120 may be included within a FMS.

On-board weather radar 122 detects and locates extreme weather (e.g. rain, snow, hail, etc.) by detecting reflectivity or returned echoes from the target and displaying the weather on a display, e.g. display 108. That is, weather data is provided from weather radar 122 to processor 104. This data is processed and provided to graphics module 110 which, in turn, is coupled to monitor 122. The weather symbology is then displayed on display 108.

The intensity of weather is often indicated by color on the display. For example, blue or green generally indicate relatively weak returns indicating low intensity weather. Red or magenta, however, represents very strong returns indicating relatively severe weather events. When describing weather radar returns, pilots, dispatchers, and air traffic controllers may refer to three levels: (1) level one being displayed as a green return indicating light precipitation and little to no turbulence; (2) level two being displayed as a yellow return indicating moderate precipitation leading to the possibility of very low visibility, moderate turbulence, and perhaps an uncomfortable ride; and (3) level three being displayed as a red return indicating heavy precipitation, the possibility of thunderstorms, severe turbulence, and possible structural damage to the aircraft.

Referring again to FIG. 1, the output of weather radar 122 is provided to PIREP data collector 114 that collects and stores weather data. Data collector 114 is also coupled to a user input device 102; e.g. a cursor controlled device, keyboard, touch screen, or the like. User input device 102 is also coupled to processor 104. A PIREP formatter 116 receives data from PIREP data collector 114 and, in conjunction processor 104, graphics module 110, and monitor 106, places the data in an appropriate format for display on display 108. That is, graphics module 110 creates the required symbology for display by monitor 106 on display 108. The PIREP display will be discussed in connection with FIGS. 2, 3, and 4.

In order to assure proper understanding of PIREPs by all users, a prescribed encoding procedure must be followed. The following reports of flight conditions should be included in the PIREP, as appropriate: height and coverage of cloud bases, tops, and layers; flight visibility; restrictions to visibility and weather occurring at altitude; air temperature and changes to temperature with altitude or range; direction and speed of wind aloft; duration and intensity of turbulence; weather conditions and cloud cover through mountain passes and over ridges and peaks; location, extent, and movement of thunderstorms and/or tornado activity; and excessive winds aloft, low level wind shear, and other phenomena bearing on safety and efficiency of flight.

Turbulence reports must include location, altitude, or range of altitudes, and aircraft type, and should include whether in clouds or clear air. The degree of turbulence, intensity, and duration (occasional, intermittent, and continuous) is determined by the pilot. Icing reports must include location, altitude or range of altitudes, aircraft type, air temperature, intensity, and type of icing. The following weather phenomena must be classified as URGENT (UUA): tornadoes, funnel clouds, or waterspouts; severe or extreme turbulence (including clear air turbulence); hail; low level wind shear; air speed fluctuations of 10 knots or more; volcanic eruption, ash clouds, and/or detection of sulfur dioxide (SO$_2$) in the cabin; and any other weather phenomena reported which are considered by the specialist as being hazardous or potentially hazardous to flight operations.

To assure proper dissemination of PIREPs to all system users, the encoding procedures described below must be followed: each element should be identified by a Text Element Indicator (TEI); each report should include the TEIs for message type, location, time, altitude/flight level, aircraft type, to describe the reported phenomena; each TEI except message type should be preceded with a space and a solidus (/); each TEI except altitude/flight level should be followed by a space; zeros should be inserted in reported values when the number of digits in the report is less than the number required by the format; only authorized aircraft designators and contractions should be used; a three character alphanumeric identifier should be included to describe locations or routes; only authorized identifiers should be used; and entries of TEIs, except as listed above, for which no data has been reported should be omitted. Each field of the PIREP may be described as follows:

UUA—Message type: Urgent PIREP.
UA—Message type: Routine PIREP.
/OV—Location with reference to a VHF NAVAID or an airport. A three or four alphanumeric identifier should be used. If appropriate, the identifier and three digits to define a radial and three digits to define the distance in nautical miles should be encoded. EXAMPLE: /OV ABC 045020 DEF 120005.
/TM—Time that the reported phenomenon occurred or was encountered. Time in four digits GMT should be entered. EXAMPLE: /TM 0915.
/FL—Altitude/flight level—The altitude where the phenomenon was first encountered should be entered in hundreds of feet (MSL). If not known, UNKN (unknown) should be entered. If the aircraft is climbing or descending, the appropriate contraction (DURC or DURD, respectively) should be entered in the remarks. If the condition was encountered within a layer, the altitude range should be entered in the appropriate TEI describing the condition. EXAMPLE: FL310.
/TP—Aircraft type—Enter aircraft type. If not known, UNKN should be entered. Icing and turbulence reports must always include the aircraft type. EXAMPLE: /TP L329.
/SK—Sky cover—This is used to report cloud layer amounts and the height of the cloud base. Heights are in hundreds of feet above sea level using three digits. Abbreviations in this group are "CLR" (clear), "BKN" (broken), and "OVC" (overcast). EXAMPLE: /SK 038 OVC045.
/WX—Flight visibility and flight weather. Weather conditions encountered by the pilot should be reported as follows: Flight visibility, if reported, will be the first entry in the /WX field. This should be entered as FV followed by a two-digit visibility value rounded down, if necessary, to the nearest whole statute mile. EXAMPLE: FV01 TRW (thunderstorm).
/TA—Air Temperature. Outside air temperature should be reported in degrees Celsius using two digits. Negative temperatures should be prefixed with an "M". EXAMPLE: /TA 15, TA 15M.
/WV—Wind direction and speed. If reported, the direction from which the wind is blowing should be specified using three figures. Directions less than 100 degrees must be preceded by a "0". For example, a wind direction of 90 degrees is coded as 090. The speed must be coded in whole knots using the hundreds digit (if not zero) and the tens and units digits. The wind group always ends with "KT" to indicate that winds are reported in knots. Speeds of less than 10 knots must be coded using a leading zero. For example, a wind speed of 8 knots must be coded 08KT and a wind speed of 112 knots must be coded 112KT.
/TB—Turbulence. Intensity, type, and altitude should be reported as follows: for intensity, enter LGT (light), MOD (moderate), EV (severe), or EXTRM (extreme). Separate a range or variation of intensity with a hyphen; for example, MOD-SEV. If turbulence was not encountered, enter NEG (negative). For type, enter CAT (clear air turbulence) or CHOP (choppy air) if reported by the pilot. Altitude should be reported only if it differs from the value reported in /FL. When a layer of turbulence is reported, the height values should be separated with a hyphen. If lower or upper limits are not defined, use BLO (below) or ABV (above). EXAMPLE: /TB LGT-MOD BLO-090.
/IC—Icing—The intensity is entered first using contractions TRACE, LGT, MOD, or SEV. The reports of a range or variation of intensity are separated with a hyphen. If icing was not encountered, NEG should be entered. The reported icing type should be entered as RIME (a type of ice), CLR, or MX (mixed). The reported icing/altitude should be reported only if different from the value reported in the /FL TEL A hyphen should separate reported layers of icing. ABV or BLO should be used when a layer is not defined. EXAMPLE: /IC SVR CLR 028-045.
/R—Remarks—This TEI is used to report a phenomenon which is considered important but does not fit in any of the other TEIs. This includes, but is not limited to, low level wind shear (LLWS) reports, thunderstorm lines, coverage and movement, size of hail (¼" increments), lightning, clouds observed but not encountered, geographical or local description of where the phenomenon occurred, International Standard Atmospheric (ISA) reports and contrails. Hazardous weather should be reported first. In addition, LLWS should be described first to the extent possible. EXAMPLE: /RM LLWS—15KT SFC-003 DURGC RNWY 22.

As stated previously, PIREP formatter 116 is coupled to PIREP data collector 114 and receives weather data there-from. PIREP formatter then places the weather data in an appropriate format for display on display 108 via processor 104, graphics module 110, and monitor 106; i.e. by creating the required symbology for display by monitor 106 on display 108.

Figure 2:
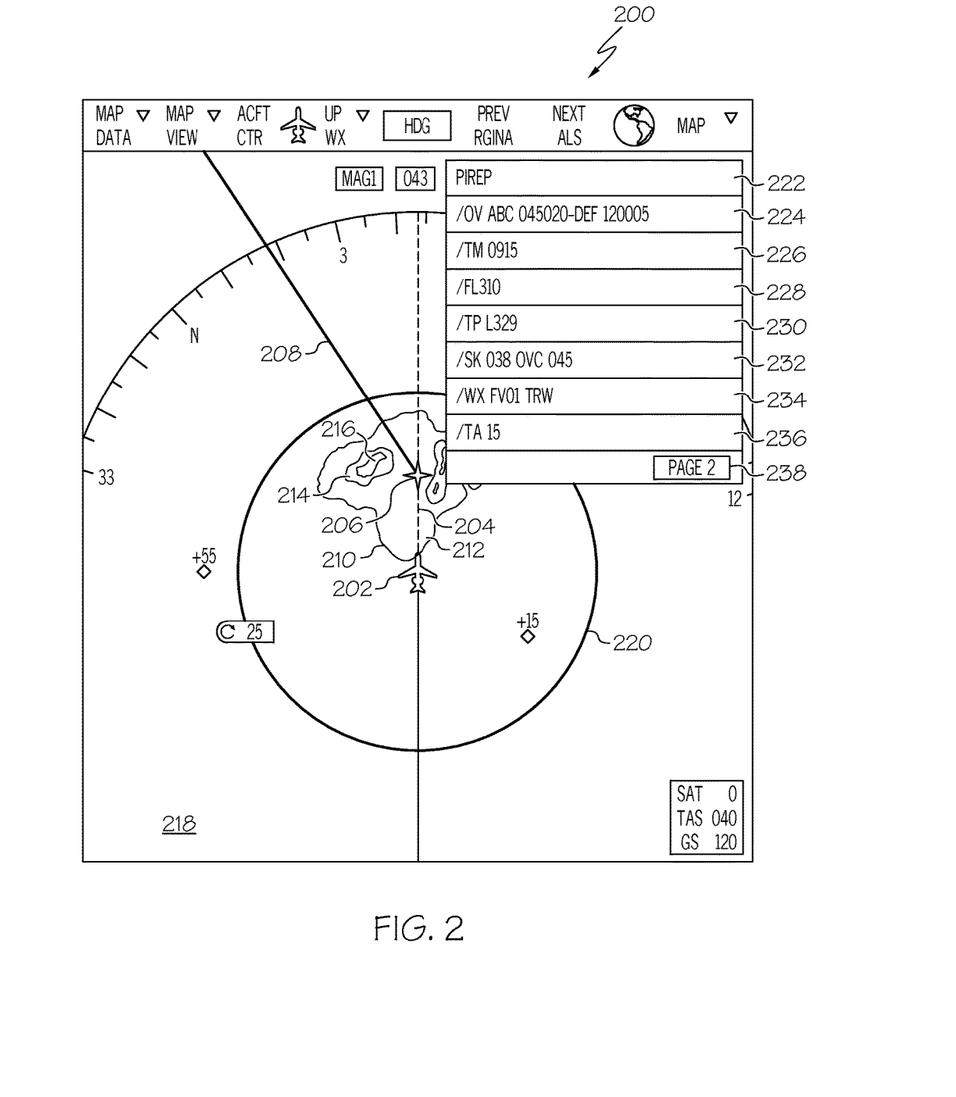
FIGS. 2-4 are snapshots of a two dimensional map display that may be generated by the avionics display system shown in FIG. 1 in accordance with an exemplary embodiment.

Referring now to FIG. 2 and in accordance with an exemplary embodiment, there is shown a graphical representation of a lateral map display screen 200 showing terrain 218 and range ring 220. Also shown on the display is host aircraft 202 proceeding along route 204 to a waypoint 206. When aircraft 202 reaches waypoint 206, the flight plan indicates that aircraft 202 will make a left turn and proceed along route 208. As can be seen, host aircraft 202 is entering an area 210 of hazardous weather characterized by a first region of low intensity weather 212 surrounding regions 214 of higher intensity weather, which in turn surround regions 216 of relatively severe weather. PIREP data collector 114 collects relevant weather data. This data is provided to PIREP formatter, which formats the data and forwards the formatted data to processor 104. Processor 104, graphics module 110, and monitor 106 cause a first page of weather data to be displayed in a PIREP data box 222 in accordance with the above described encoding procedures. As can be seen, PIREP data box 222 contains symbology graphically representative of location (OV) at 224, time (TM) at 226, altitude/flight level (FL) at 228, aircraft type (TP) at 230, sky cover (SK) at 232, flight visibility and flight weather (WX) at 234, and air temperature (TA) at 236.

Figure 3:
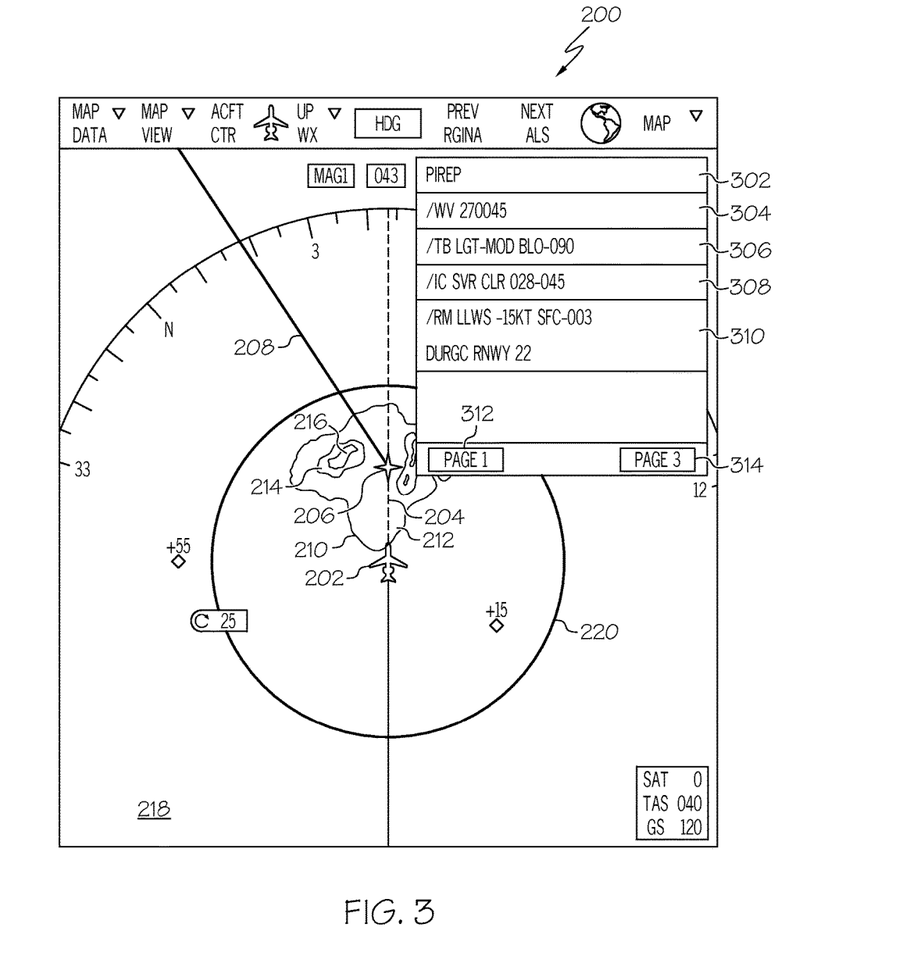

Referring now to FIG. 3, there is shown a second page comprising a second PIREP data box 302 that appears when the "Page2" button 238 (FIG. 2) is selected (or touched in the case of a touch screen). PIREP data box 302 contains symbology graphically representative of wind direction and speed (WV) 304, turbulence (TB) 306, icing (IC) 308, and remarks (RM) 310, thus completing the PIREP. It should be clear that the pilot may navigate between the first and second pages by using the page select buttons 238 (FIG. 2) and 312 and 314 (FIG. 3). It should also be clear that while in the exemplary embodiment, two pages of data boxes have been employed to display all PIREP data, the PIREP may also be displayed in a single data box or more than two data boxes.

Figure 4:
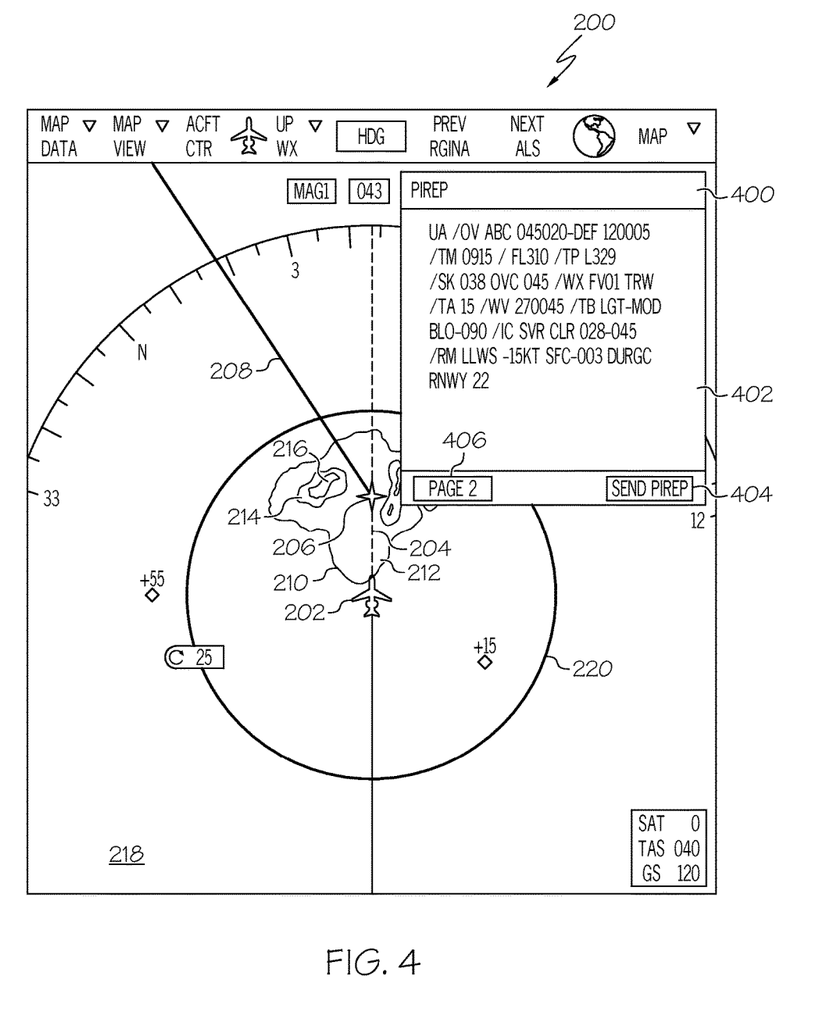

When the pilot has reviewed the PIREP data on the first and second pages and concurs with the contents thereof, the final PIREP appears at 400 in FIG. 4. The pilot may send the PIREP to, for example, ATC by selecting the Send PIREP button 402, or return to page two by selecting the Page2 button 404. If button 402 is selected, the final PIREP report will be transmitted via datalink 112 and transceiver 118 (FIG. 1).

Figure 5:
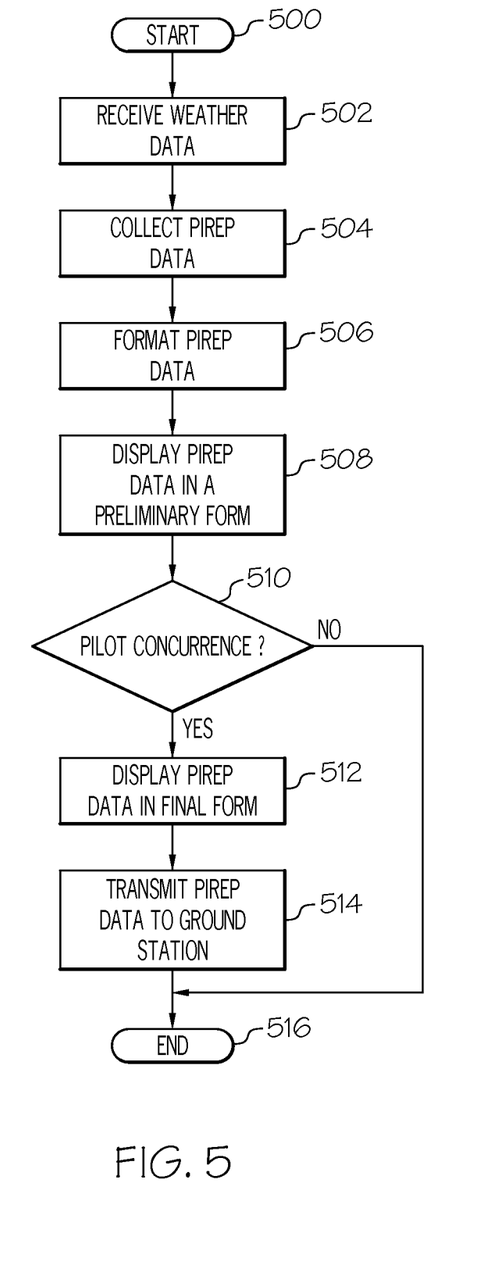
FIG. 5 is a flowchart describing the steps for generating a PIREP in accordance with an exemplary embodiment.

FIG. 5 is a flow chart describing a method 500 for displaying and sending PIREP data. In STEP 502, weather data is received by onboard weather radar 122 (FIG. 1 by detecting reflectivity or returned echoes from a target area. This data is provided to a PIREP data collector (STEP 504) and converted to a PIREP format (STEP 506). This data is then displayed in a preliminary manner (STEP 508) that that facilitates pilot review. If the pilot does not concur with the preliminary data (STEP 510), the process ends (516), and no PIREP is transmitted. If the pilot concurs, The PIREP is displayed in final form (STEP 512) and transmitted to ground (STEP 514) upon pilot command.

Thus, there has been provided system and method for facilitating the collection and formatting severe weather related information encountered during a flight, textually and graphically presenting it in proper PIREP format to a pilot for the pilot's concurrence, and then transmitting the PIREP to a ground station. This reduces pilot workload and provides aircraft in surrounding airspace the opportunity to avoid bad weather, especially those aircraft not equipped with weather radar. Such a system contemplates the automatic collection of the required PIREP data and presentation of the data to the pilot in the prescribed PIREP format. In addition, the system may be included in a selective multicast system that provides the PIREP from a ground station to a fleet based subscriber.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for graphically and textually displaying weather data on an onboard aircraft display, the method comprising:
   receiving, by a PIREP (pilot report) data collector, weather data from an onboard weather radar;
   converting, by a PIREP formatter coupled to the PIREP data collector, the weather data in the PIREP data collector to PIREP formatted weather data;
   displaying, on the aircraft display, the PIREP formatted weather data in a preliminary form for concurrence by a pilot; and
   rendering, on the aircraft display, the PIREP formatted weather data in a final PIREP form, after pilot concurrence.

2. The method of claim 1, further comprising transmitting the PIREP formatted weather data in the final PIREP form to a ground station, in response to a pilot command.

3. The method of claim 2, further comprising displaying the preliminary form of the PIREP weather data as a page in at least one pop-up data box on the aircraft display for pilot review and concurrence.

4. The method of claim 3, further comprising displaying the preliminary form of PIREP weather data as sequential pages in at least first and second pop-up data boxes on the aircraft display for pilot review and concurrence.

5. The method of claim 4, further comprising sequentially displaying the first and second pop-up data boxes.

6. The method of claim 5, further comprising displaying control buttons in the first and second pop-up data boxes for navigating between the first and second pop-up data boxes.

7. The method of claim 6, further comprising displaying an additional pop-up data box containing the data of the first and second pop-up data boxes rendered as a page in the final PIREP form, for transmission to a ground station.

8. The method of claim 7 further comprising displaying the at least one pop-up data box and the additional pop-up data box superimposed on a map display.

9. A method for displaying weather data on an aircraft display, the method comprising:
   collecting weather data from an onboard weather radar;
   placing the weather data in a pilot report (PIREP) format; and rendering the weather data in the PIREP format in a preliminary form, in at least one pop-up data box on the aircraft display for concurrence by the pilot.

10. The method of claim 9, further comprising displaying the PIREP in a final form after in response to receiving a pilot concurrence.

11. The method of claim 10, further comprising displaying the PIREP data in the preliminary form on first and second pop-up data boxes forming first and second pages.

12. The method of claim 11, further comprising displaying the PIREP data in a final form in an additional pop-up data box, the additional pop-up data box and the first and second pop-up data box each displaying control buttons for navigating between the first and second and additional pop-up data boxes.

13. The method of claim 12, further comprising displaying the first, second, and additional pop-up data boxes over a map display.

14. A system for graphically displaying weather data on an aircraft display, the system comprising:
    onboard weather radar;
    a data collector coupled to the weather radar;
    a formatter coupled to the data collector for placing the data in a PIREP format, to thereby form PIREP data;
    a graphics module; and
    a processor coupled to the data collector, the formatter, and to the graphics module, and configured to render the PIREP data on the aircraft display.

15. The system of claim 14, wherein the processor is further configured to render the PIREP data on the aircraft display in at least one pop-up data box.

16. The system of claim 15 wherein the processor is further configured to display the PIREP data in a preliminary form in the at least one pop-up data box for pilot concurrence.

17. The system of claim 16, wherein the processor is further configured to render the PIREP data on the aircraft display in a final form in an additional pop-up data box, in response to a pilot concurrence.

18. The system of claim 16, wherein the aircraft display is a touch screen display.

* * * * *